US012555102B2

(12) United States Patent
Salmon, IV et al.

(10) Patent No.: US 12,555,102 B2
(45) Date of Patent: Feb. 17, 2026

(54) DIGITAL INFRASTRUCTURE TO PERFORM MULTI-NETWORK CONNECTIONS

(71) Applicant: Salmon Upstream, LLC, Lynchburg, VA (US)

(72) Inventors: John McClure Salmon, IV, Lynchburg, VA (US); Christopher Gregory Tavares Jaeger, Lynchburg, VA (US)

(73) Assignee: Salmon Upstream, LLC, Lynchburg, VA (US)

( * ) Notice: Subject to any disclaimer, the term of this patent is extended or adjusted under 35 U.S.C. 154(b) by 0 days.

(21) Appl. No.: 17/731,104

(22) Filed: Apr. 27, 2022

(65) Prior Publication Data

US 2022/0351196 A1 Nov. 3, 2022

Related U.S. Application Data

(60) Provisional application No. 63/182,211, filed on Apr. 30, 2021.

(51) Int. Cl.
*G06Q 20/00* (2012.01)
*G06Q 20/38* (2012.01)
*G06Q 20/40* (2012.01)
*G06Q 20/42* (2012.01)

(52) U.S. Cl.
CPC ....... *G06Q 20/3821* (2013.01); *G06Q 20/401* (2013.01); *G06Q 20/42* (2013.01)

(58) Field of Classification Search
None
See application file for complete search history.

(56) References Cited

U.S. PATENT DOCUMENTS

| | | | |
|---|---|---|---|
| 7,430,755 B1 | 9/2008 | Hughes et al. | |
| 7,849,096 B2* | 12/2010 | Fein | G06F 16/2425 |
| | | | 707/765 |
| 2001/0054020 A1 | 12/2001 | Barth et al. | |
| 2002/0107849 A1* | 8/2002 | Hickey | G06Q 10/10 |
| 2003/0133554 A1 | 7/2003 | Nykanen et al. | |
| 2004/0093321 A1* | 5/2004 | Roustant | G06F 16/9538 |
| 2010/0030752 A1* | 2/2010 | Goldentouch | G06F 16/81 |
| | | | 707/E17.108 |
| 2012/0331528 A1 | 12/2012 | Fu et al. | |

(Continued)

OTHER PUBLICATIONS

Grasselli; An Industrial Network Digital Twin for enhanced security; IEEE; 7 pages; 2022.*

(Continued)

*Primary Examiner* — Radu Andrei
(74) *Attorney, Agent, or Firm* — Davis Wright Tremaine LLP

(57) ABSTRACT

The current document discloses systems and methods that implement digital management of multi-network connections. When the digital infrastructure manager receives a client request for access to a service or service provider, the digital infrastructure manager issues a signed access token to the client, and the access token utilized in various ways when service requests are processed. The digital infrastructure manager then processes, transmits, and manages the request, response, and any additional actions required to satisfy the request including multiple and/or additional requests by the same or other clients.

15 Claims, 8 Drawing Sheets

(56) References Cited

U.S. PATENT DOCUMENTS

| | | | |
|---|---|---|---|
| 2013/0132854 A1* | 5/2013 | Raleigh | G06F 3/0482 |
| | | | 715/738 |
| 2014/0244619 A1* | 8/2014 | Doroshenko | G06F 16/3331 |
| | | | 707/769 |
| 2016/0095153 A1 | 3/2016 | Chechani et al. | |
| 2017/0201850 A1* | 7/2017 | Raleigh | H04W 4/50 |
| 2020/0045519 A1* | 2/2020 | Raleigh | H04W 4/08 |
| 2021/0109931 A1* | 4/2021 | Hebert | G06F 16/2425 |
| 2022/0197899 A1* | 6/2022 | Kanani | G06F 16/285 |
| 2022/0300560 A1* | 9/2022 | Filice | G06F 16/90335 |

OTHER PUBLICATIONS

Wein; Embedding Active Asset Administration Shells in the IOT using the Smart Systems; IEEE; pp. 23-28, 2022.*
International Search Report and Written Opinion mailed Aug. 24, 2022, Patent Application No. PCT/US2022/026553, 8 pages.
Covington et al., "Securing Context-aware Applicaitons Using Environment Roles", Proceedings of the sith ACM Symposium on Access Control Models and Technologies, May 1, 2001, 15 pages.
European Patent Office, "Search Report" in Application No. 22796649.6-1218, Jul. 19, 2024, 8 pages.
Anonymous: "OAuth—Wikipedia", Sep. 25, 2014, <https://en.wikipedia.org/w/ndex.php?title=OAuth&oldid=627018047,> 9 pages.
Cherian Mathew et al., "Policy Mediation to Enable Collaborative Use of Sensitive Data", Apr. 26, 2010, XP093180774, 6 pages.
Speicher, Maximilian et al., "S.O.S.: Does Your Search Engine Results Page (SERP) Need Help?", Search and Recommendations, CHI 2015, Crossings, Seoul Korea, Apr. 18, 2015, 10 pages.

* cited by examiner

DIGITAL INFRASTRUCTURE TO PERFORM MULTI-NETWORK CONNECTIONS

CROSS-REFERENCE TO RELATED APPLICATION

This application claims priority to U.S. Provisional Patent Application No. 63/182,211, filed Apr. 30, 2021, entitled "NETWORK ACCESS AND CONNECTION SYSTEM WITH MASTER CONNECTION CONTROLLER," the disclosure of which is herein incorporated by reference in its entirety.

BACKGROUND

As the use of computer systems for organizational management becomes nearly ubiquitous, the ability to manage user access to multiple systems while allowing those systems to meet the specific needs of that organization has become essential. In data communications and digital information sharing, network access control is critical for allowing effective functionality while assuring network security and user privacy. Large numbers of diverse users need access to increasingly complex and dynamic networks. Access controls intended to provide security and safety can have the unintentional side effect of restricting access to data or communications or require multiple access points with separate user accounts. For example, in some systems, digital document transmission of secure records such as personal health information requires a system to have access to both the secure network where the documents originate, the user's network, and the network where the records are being transferred. As a result, the user must often interact with multiple applications to achieve a single task. Accordingly, in many environments, negotiating these many applications and networks can be prohibitively time consuming and laborious for both computer systems and users.

Managing complex digital infrastructures including diverse networks involves many challenges. Even in a small community of networks, network access requests can be inefficient and burdensome for computers to process, particularly when the requests are originating from outside the secure boundaries of a network. Additionally, the demands of increasingly digital communications require efficient integrated connectivity of both computer systems and networks. For example, in many instances a user benefits from having a single point of access to multiple networks, but such a system also benefits computer systems and networks by reducing the number of requests being delivered to that network from sources which need to be parsed. Ordinarily a request delivered to a network by a computer system must be processed by the network to determine not only access but how to handle the substance of the request. Since a request could be directed to many different things including transportation, medical or public works, social communications or community management, assigning the role of request triage and access control to a digital infrastructure manager reduces congestion and processing demands on individual networks.

BRIEF DESCRIPTION OF THE DRAWINGS

Various techniques will be described with reference to the drawings, in which.

DETAILED DESCRIPTION

Figure 1:
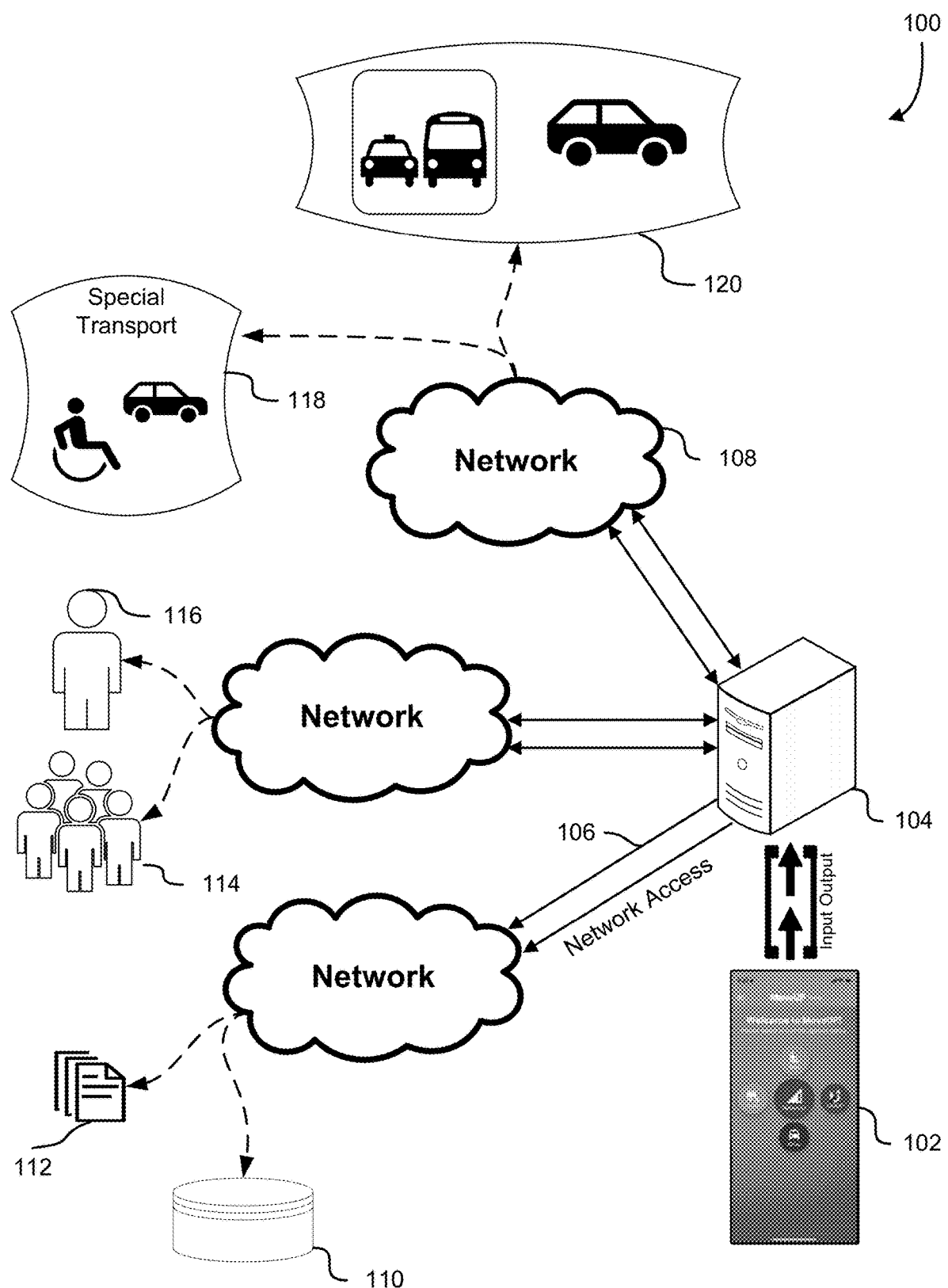
FIG. 1 is an illustrative example of a diagram in which a client input device transmits a request, and the network access controller processes the request in accordance with an embodiment.

In the following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques and systems described herein relate to a digital infrastructure solution allowing a system to better manage or otherwise facilitate digital connections between a plurality of users, on a plurality of networks, for a plurality of requests. The techniques described and suggested in the present disclosure improve the field of computing, especially the field of network access and request management, by enabling increased digital interactivity, while reducing network congestion and client inconvenience. Additionally, techniques described and suggested in the present disclosure improve the efficiency and function of computing and network management systems by enabling secure access to information and data located on a plurality of networks or computer systems without burdening each network with multiple access requests that must be processed individually. Moreover, techniques described and suggested in the present disclosure are necessarily rooted in computer technology in order to overcome hurdles arising with the segregation of information and data access, which are presented by network bottlenecks and ill-fitting access restrictions.

In one implementation of the digital infrastructure manager, also known herein as the network access controller, a client request to perform one or more operations is simultaneously handled on multiple networks including networks operated by various entities. Each of the multiple networks to which the request will be processed could maintain access policy databases that support non-limiting access policies and limiting access policies, but the digital infrastructure manager processing the request would be granted permission to access the networks by the access policies, even where the user themselves may not have been granted individual access. Typically, when a client requests access to a service, access is determined based on the identity and characteristics of the client, which can be attributes stored in a database in association with the client. However, when the digital infrastructure manager processes a request for access to a service, access is determined based on the identity and characteristics of the digital infrastructure manager rather than the individual client. Thus, the access policy of the service determines whether client access to the service is permissible based on an authentication provided by the network access controller such that one or more services may be tasked with carrying out a client request once the request is transmitted to the service by the network access controller.

FIG. 1 illustrates an example of an environment in which various embodiments may be practiced. In an embodiment, the environment 100 includes a service access application 102 that provides a point of access to multiple services through the digital infrastructure manager (AKA-network access controller) 104.

The service access application 102 could be an application on a smartphone, a program on a computer, or a service on a server, any other digital service or services, or other client comprising an interface to which a user can input, select, or receive data. When a client generates a request input in the service access application 102, the input data is processed by extracting information from the request and possibly from one or more other sources (e.g., a database), then compiling and transmitting the processed request input such as described below in connection with FIG. 4 to the digital infrastructure manager 104. For example, in some embodiments, the request input comprises a plurality of selected settings combined with embedded client data contained in the service access application 102. The embedded data, in one example, includes GPS location, gender, sex, age, or any other data not specifically included in the plurality of selectable settings but retained by the service access application 102 which is pertinent to the request input. In another example embodiment, the request input data is passed directly to the digital infrastructure manager 104 without modification from the initial client input. After processing and passing along the request input, the service access application waits for a return response from the digital infrastructure manager 104. In some embodiments, while waiting the service access application 102 monitors inputs and outputs from the digital access manager 104 and refreshes any data for display. Once a return response is received from the digital access managers 104, the service access application 102 updates any displayed data to reflect the return response and enables the client to act on the information in the return response. In some embodiments, the service access application 102 processes the return response data for display by a digital device. In yet another embodiment, the service access application 102 processes the return response to include additional request input data entered by the client after the return response was received. This processing includes generating and transmitting a new request input, or a request to update or terminate the initial request input. In other embodiments, the processing includes digitally communicating with another service regarding the response. In yet another embodiment, this processing includes collection, storage, controlling or managing client data, locating or monitoring of GPS location, identifying or monitoring geo-locational relationships between two or more datapoints, digital time or action management, data sharing between one or more clients, services, or entities, or any other process described in the paragraphs above and below.

In at least one embodiment, the digital infrastructure manager 104 is a computer program or collection of computer programs operating together that manages and handles network access requests, service queries, responses, and data transfers. When the digital infrastructure manager 104 receives a processed request input from the service access application 102, it generates a second request based on the processed request input and submits the second request through a network access tunnel 106 to various networks 108. Once the second request is submitted, the digital infrastructure manager may operate to maintain the security of the network access tunnel 106, maintain an ongoing functionality in managing activity relating to any requests passed through the network access tunnel 106, or may maintain a limited operational presence in accordance with various embodiments.

In some environments, particularly where service providers have implemented limited access policies, the digital infrastructure manager 104 is granted access to the networks 108 through the network access tunnel 106 based on the identity and characteristics of the digital infrastructure manager 104 itself. The network access tunnel 106 is a pathway for transporting data across a digital network via protocols that are associated with the digital infrastructure manager 104.

For example, where a request input is transmitted to a network 108 where a limited access policy is implemented, the network 108 would recognize the digital infrastructure manager 104 as a client permitted to access the network. This enables the client who generated the request input to access the network 108 securely, even where the client itself may not be granted access by the limited access policy.

In another embodiment, network access is granted based on the identity and characteristics of the digital infrastructure manager 104 in conjunction with client data embedded in the request input as described above. For example, in an embodiment where the networks 108 limited access policy requires a heightened level of security, the network access tunnel 106 includes the identity and characteristics of the digital access manager 104 and data unique to the client such as the embedded data as referenced above in this paragraph. In the particular example of an embodiment where the networks 108 contain medical records data and additional identity and characteristics must identify the client directly, the network access tunnel 106 would include this required information in the second request transmitted to the network.

In yet another environment, network access is granted to service providers without limited access policies, or with minimal restrictions. In such environments, access to the networks 108 is granted based on the identity and characteristics of the digital infrastructure manager 104, even for services where the client would be permitted access based on their own individual identity or characteristics.

Generally, a network 108 as used herein, unless otherwise clear from context, is a service that performs operations in response to triggers, such as via calls to an application programming interface of the service. The operations can include communications to and from other clients for the purpose of generating responses to such calls. For example, in accordance with an embodiment, the services accessible on the networks 108 comprise digital communication, data and/or document transfer, navigation, mapping and/or location tracking, real-time or post-read data acquisition, data storage, or combinations of these capabilities. In another embodiment, the networks 108 comprise any other service as described in the paragraphs above and below, or any other service accessible digitally and not previously mentioned. In yet another embodiment, the networks 108 comprise sub-networks as described in FIG. 2 and in the paragraphs below.

In some environments, the database 110 may comprise activity management, trip and/or transportation, e-commerce, event management including organization, participation, and results reporting; health or wellness related actions, data evaluation, therapeutic or ongoing medical condition management. In another environment, the database 110 comprises any other service described in the paragraphs above and below, or accessible digitally and not previously mentioned.

In some environments, the records 112 comprise storage of documents whether text, audio, images, or video, archived, current, or ongoing input, social, family, physical, mental health or other medical information or medically relevant data, legal or other contractual documentation, historical information, location information, data point movement, social or geo-locational data. In another environment, the records 112 comprises any other records accessible digitally and not previously mentioned.

In some environments, the large group 114 comprises any large group of clients who reside on the same network and can communicate digitally. In another environment, the large group 114 comprises any other type of large group that could communicate digitally but has not been previously mentioned.

In some environments, the small group 116 comprises a single client or a small group of clients who reside on the same network and can communicate digitally. In another environment, the small group 116 comprises any other type of small group that could communicate digitally but has not been previously mentioned.

In an environment, the special transport 118 comprises transportation services which the digital infrastructure manager 104 has verified to meet qualifications specific to the services, or qualification permissions to be included in the networks 108. In some environments, the additional qualifications comprise detailed vetting such as background checks, training or skills of the client associated with a user or service provider. For example, where the special transport 118 is within a network 108 which provides medical transportation services, the digital infrastructure manager 104 would require any service provider to submit proof of those qualifications before listing the service provider within the networks 108.

In some environments, the transport 120 comprises public transportation such as planes, trains, taxis, rideshares, and other public transit. In other environments, it could comprise automobiles, bikes, motorcycles, tricycles, rickshaws, carts, animal transport, or any other service providing transit.

Figure 2:
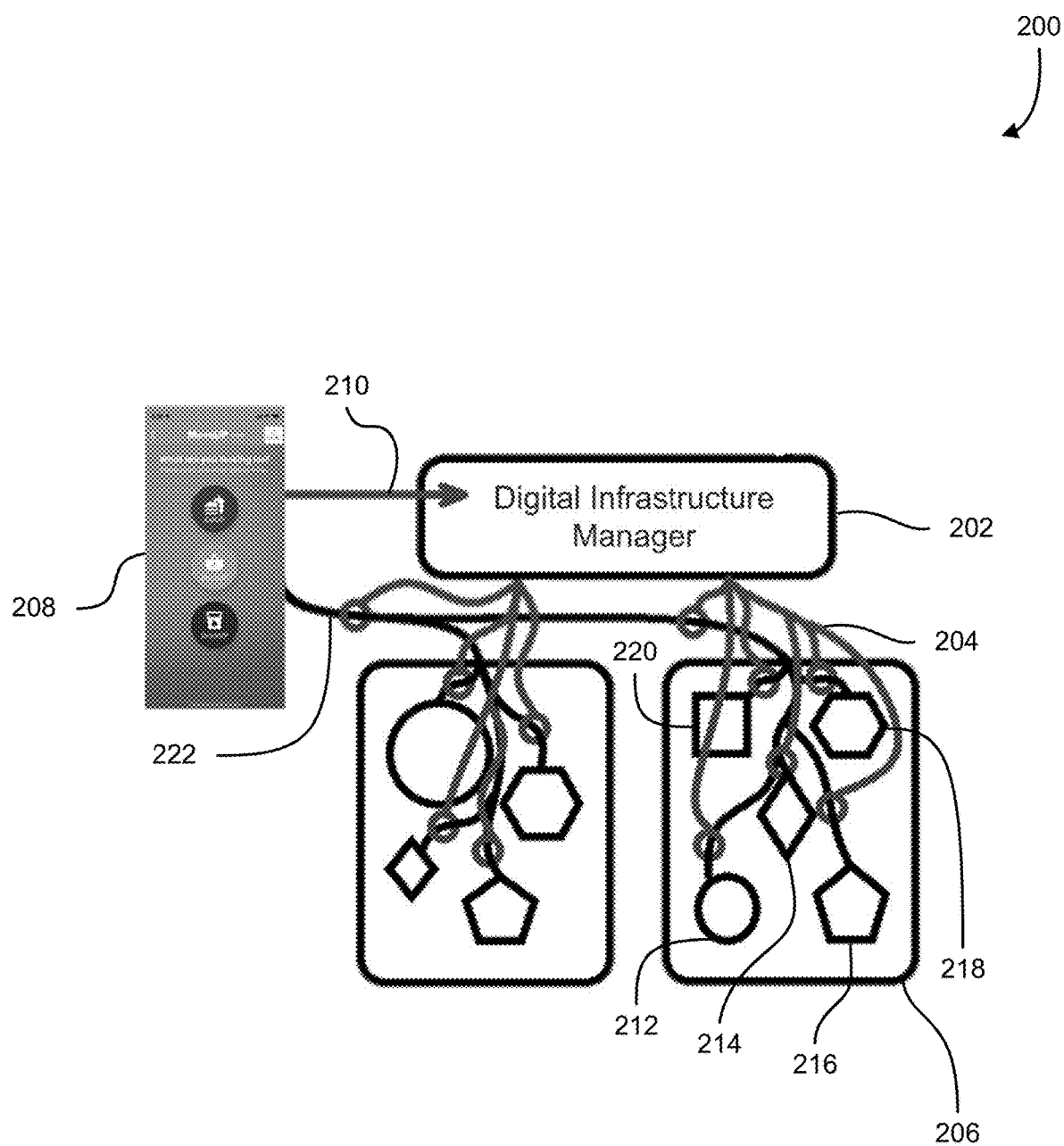
FIG. 2 illustrates an example of the relationship between the digital infrastructure manager (AKA—the network access controller), a client request, the plurality of networks, the pluralities of network data, and the end user input devices in accordance with an embodiment.

FIG. 2 shows an illustrative example of how the digital infrastructure managers 202 could process a client request on a computer network or plurality of networks in accordance with an embodiment. The diagram 200 illustrates a service access application 208 which, in parallel, has access to the digital infrastructure manager 202 and is connected by way of a computer network connection 222 to a network or a collection of networks 206.

In an embodiment, the digital infrastructure manager 202 is the same digital infrastructure manager 104 in FIG. 1. Generally, in accordance with an embodiment, the digital infrastructure manager 202 requires a digital connection to both the service access application 208 and the networks 206 or sub-networks and is able intercept, control, or restrict activity over connections within network access tunnel 204. In some embodiments, this digital connection is through a computer network connection 222 simultaneously shared with the service access application 208. In other embodiments, this connection is through a computer network connection 222 not shared with the service access application 208 or some other connection to the internet or other communications network. Further, in accordance with yet another embodiment, the digital infrastructure manager 202 may interact via remote procedure calls or other such communications to connect with and execute actions on a network 206, or any sub-network within the network 206, through a connection as described above.

In certain embodiments where the digital infrastructure manager 202 shares the computer network connection 222 with the service access application 208, the network access tunnel 204 is passed through the shared connection. But generally, including embodiments where the connection is shared as described in this paragraph, client access to the networks 206 or sub-networks is granted as described above, or other paragraphs herein.

The network access tunnel 204, in accordance with an embodiment, is the same as the network access tunnel 106 in FIG. 1. The network access tunnel 204 illustrates how, in some embodiments, the digital infrastructure manager 202 maintains simultaneous connection with the service access application 208, and the computer network connection 222, the networks 206, and any sub-networks through the network access tunnel 204. For example, in an embodiment where the network access tunnel 204 connects to the networks 206 or sub-networks through a computer network connection 222 as described in paragraph 30 above, the request input from a client is first transmitted to the digital infrastructure managers 202, and then through the network access tunnel 204 being passed through the shared computer network connection 222. In such embodiments, when the digital infrastructure managers 202 access networks 206 or sub-networks, it maintains its own identity and characteristics and does not assume the identity and characteristics of the service access application 208 except as provided for in paragraph [0019] above. Illustrated in the particular example of FIG. 2, in some embodiments, the networks 206 comprises sub-networks 212-220 as described herein, which are individually the same as the network 108 in FIG. 1 except that they are located within another network 206. For example, in accordance with an embodiment and illustrated in the particular example of FIG. 2, the network 206 comprises the sub-networks 212-220 located within the digital boundaries of the network 206. As illustrated in this paragraph and FIG. 2, one or all of the sub-networks 212-220 may not be directly connected to the internet or the client device while the network 206 may be directly connected to the internet or the client device. In this example, the sub-networks are nevertheless accessible to the client because the digital infrastructure manager is permitted to access the sub-networks using the digital connection of and through the network 206. In an embodiment, the community of networks 206 comprises the structure descried above, one where both the networks 206 and any sub-networks are each directly connected to the internet or client device, or any other service, collection of services, or sub-network or collection of sub-networks accessible digitally.

In at least one embodiment, service access application 208 can be the same service access application 102 described above in connection with FIG. 1.

The request input 210 can be the same request input described above. As illustrated in FIG. 2, in accordance with an embodiment, the request input 210 is transmitted directly to the digital infrastructure managers 202, even in embodiments where the digital infrastructure manager 202 shares a computer network connection with the service access application 208 as described in paragraph [0031] above.

In an embodiment, the sub-network 212 comprises a sub-network within the network 206, the sub-network having requirements, functionality, or qualifications that differ from the networks 206. For example, in accordance with an embodiment, the sub-network 212 comprises a service belonging to an organization or entity within another organization or entity, such as a non-profit branch of a for-profit business of any size or scope. In another environment, the sub-network 212 comprises a private communication network within a public communication platform. In yet another environment, the sub-network 212 comprises any other sub-network service accessible digitally and not previously mentioned.

In an embodiment, the sub-network 214 comprises a learning institution whether in-person, virtual or a combination of in-person and virtual, such as an individual school within a larger school system network. In another embodiment, the sub-network 214 comprises a college, or university network having individualized requirements that differ from that of the network 206 associated with the other colleges or universities within that educational system. In another environment, the sub-network 214 comprises any other learning institution service accessible digitally and not previously mentioned.

In an environment, the sub-network 216 comprises a rail network within a public transportation system. In another environment, the sub-network 216 comprises an office of economic development, office of parks and recreation, department of public health, or other locality management organization existing within the larger network 206 belonging to any federal, state, local or municipal government organization. In yet another environment, the sub-network 216 comprises any other public service accessible digitally and not previously mentioned.

In an embodiment, the sub-network 218 comprises a medical or health system network, a specialization or a group of providers across a spectrum of specializations within a larger hospital network 206. In another embodiment, the sub-network 218 comprises a group of hospital networks within a larger medical provider or group of related providers. In another environment, the sub-network 218 comprises any other service, health, or hospital system network accessible digitally and not previously mentioned.

In an embodiment, the sub-network 220 comprises a group or organization of groups or organizations such as a restaurant consortium, a business alliance, a network of personal service providers, a sports league or other organization of teams, or any other grouping of entities having a common interaction, existing within a larger network 206 associated with the purpose of the sub-network 220.

Figure 3:
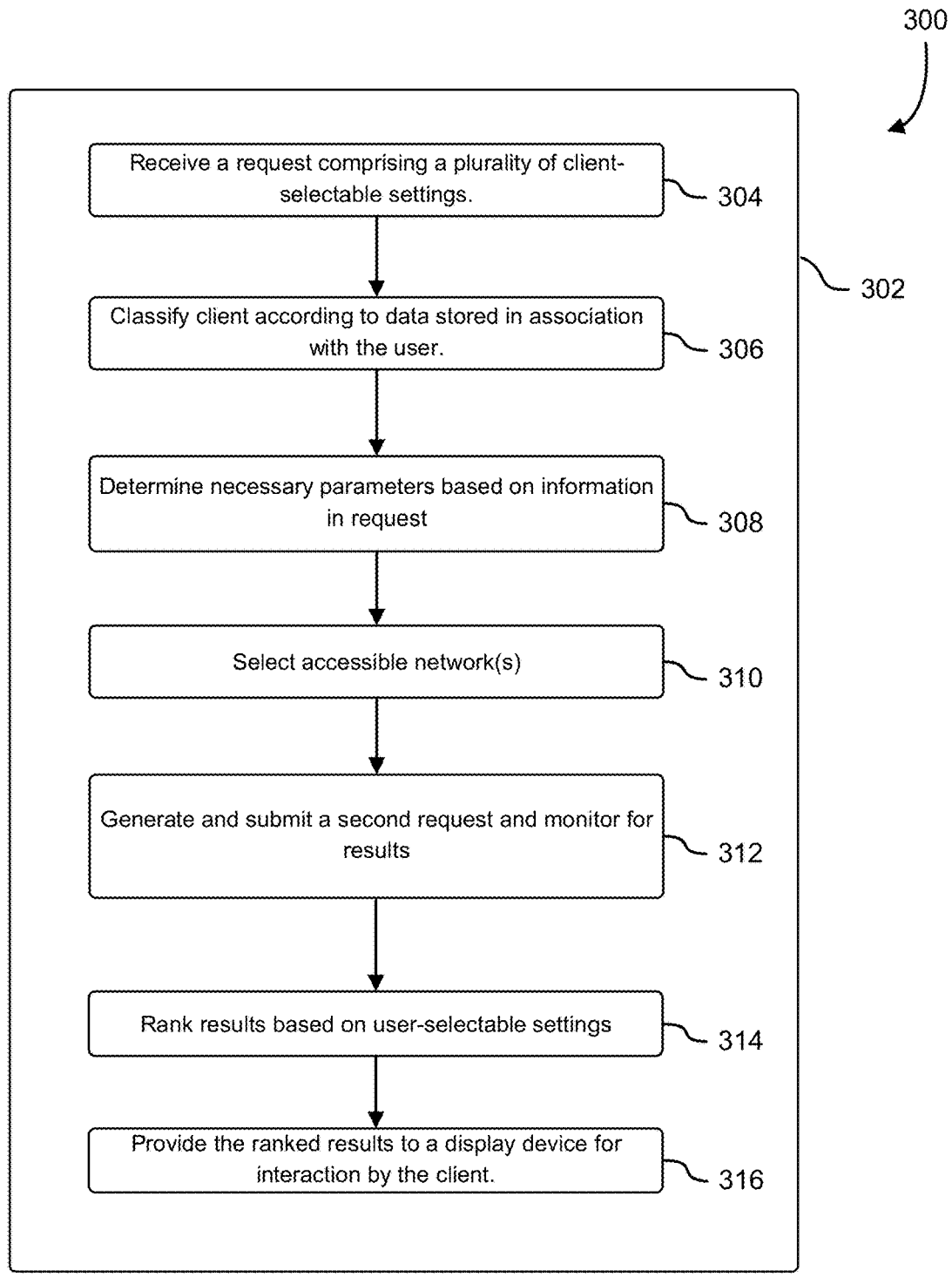
FIG. 3 is a flow chart illustrating how the digital infrastructure manager could processes a client request input in accordance with an embodiment.

FIG. 3 shows an illustrative example of a client initiated service request in accordance with an embodiment. The request input structure 302 described in environment 300 of FIG. 3 can be an implementation of the same request input described in paragraphs above in accordance with an embodiment. It illustrates a request input structure 302 with example processes for each flow step. When a client delivers a request to the digital infrastructure manager, the request is processed to generate a query communicable to services. In various embodiments, some or all of the process described in environment 300 can be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 300 may be performed by any suitable system, such as the digital infrastructure manager 104 of FIG. 1.

In an embodiment, the received query 304 comprises a plurality of client-selectable settings that identifies the purpose of the received query 304, a target network or groups of networks, or an action which will satisfy the received query 304, or any other purpose as described in accordance with an embodiment herein.

The client classification 306 identifies the client as a person, group, computer, or other entity in accordance with an embodiment who would be permitted to generate an input request 302. In the particular example of FIG. 3, the client classification 306 is shown as classifying a client based on data associated with a user. In another embodiment, client classification 306 could include classifying but segregating data associated with the particular client as described in paragraphs above.

The parameters determination 308 specifies parameters related to the received query 304. In accordance with an embodiment, the specified parameters are those which enable the digital infrastructure manager to process the received query 304 to achieve the desired result of the query. As an example, the parameters determination 308 could specify parameters including a service, resource, group of services or resources, a network or group of networks, an action or series of actions to be performed, a GPS location or series of GPS locations, a document or data to execute an action upon, or any other parameter described in accordance with an embodiment.

The network selection 310 selects one or multiple networks from all networks accessible by the digital infrastructure manager, according to information associated with the received query 304, client classification 306, and necessary parameters 308. In some instances there may not be any networks available which could satisfy the requirements of the received query. When this occurs, the request input 302 terminates and the client is notified the request is terminated. In other instances where one or more networks are available to satisfy the received query, a second request 312 is generated and submitted to each available network. The networks to which the second request has been submitted are then monitored for response results. In ranked results 314, any results received in response to the second request 312 are ranked according to client selectable settings transmitted in the received query 304. In some instances this ranking could be from lowest to highest or the reverse, most relevant to least relevant or the reverse, or any other ranking described in accordance with an embodiment. The ranked results are then provided for display and interaction by the client in the display 316. In an implementation, the client could interact with the displayed results by selecting from the ranked results, a result which satisfies the purpose of the request input descried in the paragraphs above and below. In another implementation, the client could interact by terminating the request input without selecting any of the ranked results, or could fail to interact with the ranked results, which would produce the same termination result. In yet another implementation, the client could generate a new request input, or could modify the initial required input with additional parameters, which would then be processed as described in the paragraphs above and below.

Figure 4:
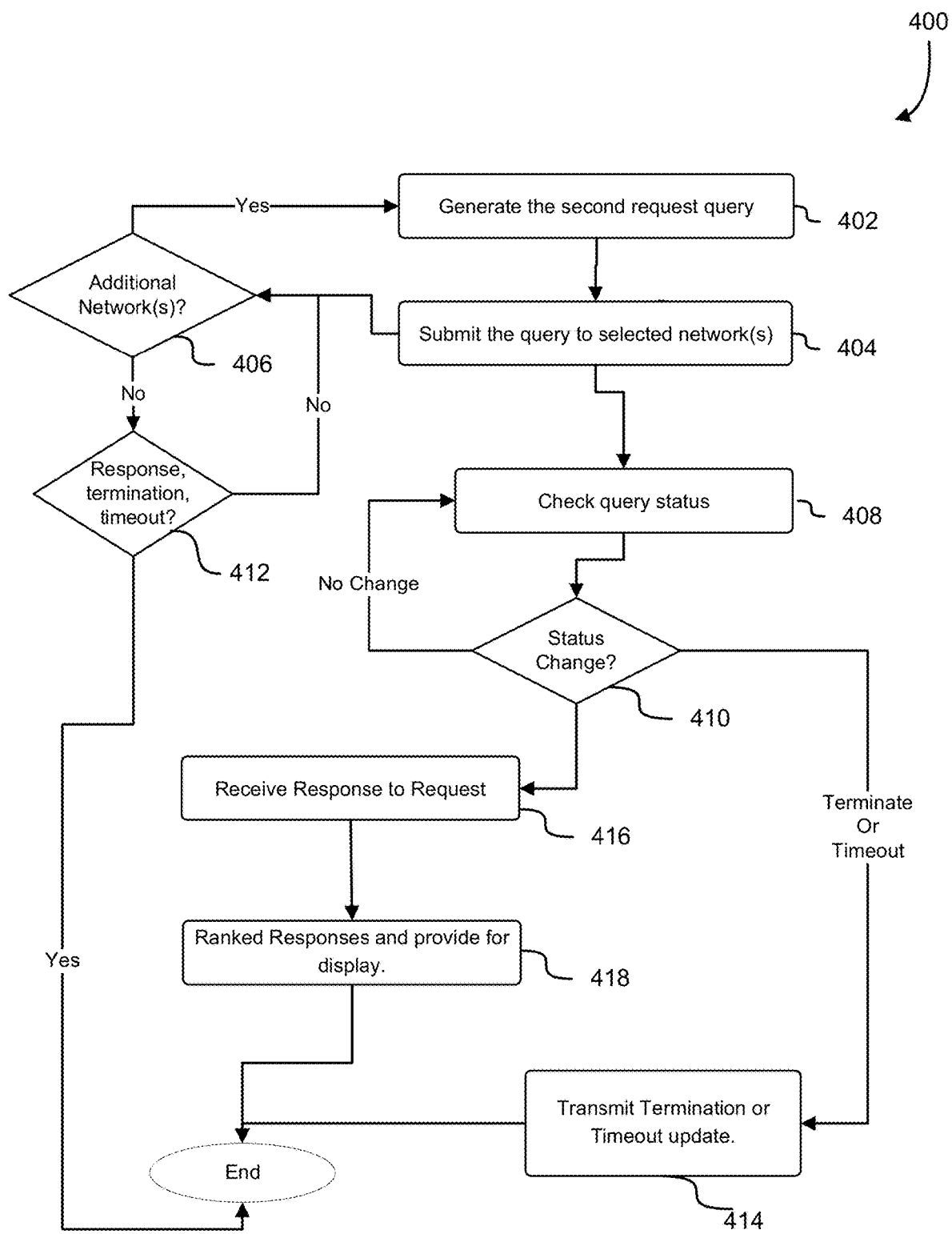
FIG. 4 is a flow chart illustrating how the digital infrastructure manager could monitor a request input in accordance with an embodiment.

FIG. 4 shows an illustrative example of a data architecture in a second request in accordance with an embodiment. The data architecture 400 is an illustrative example of the same second request 312 described in paragraphs above and below. In various embodiments, some or all of the process described in environment 400 can be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system, such as the digital infrastructure manager 104 of FIG. 1. In accordance with an embodiment, the data architecture 400 illustrates generating a second request query 402 which is based at least in part on information associated with a first request as described in the paragraphs above and below, then submitting the query 402 to selected networks at the query submission 404. The selected networks 404 are the same selected networks as described in other paragraphs herein. Note that one or more of the operations performed in 402-14 may be performed in various orders and combinations, including in parallel.

In an implementation, once a query 402 is generated and submitted to selected network(s) by the query submission 404, additional networks 406 would begin a check-loop to detect any new networks which were not selected at the time of first query submission, but which have become available for selection. In instances where new selected networks are found by additional networks 406, the newly detected networks are added to the list of selected networks. For networks added to the list of selected networks after the first submission of query 402, the same query 402 would be submitted to those new networks by the query submission 404. In instances where no new networks are detected by additional networks 406, the check 412 is activated. The check 412 returns positive determination if there has been a response from any network to the query 402, or a termination or timeout of the query 402, and then ends the additional networks 406 loop. The check 412 returns a negative determination where any of the conditions described in the previous sentence are not met, and then restarts the additional networks 406 loop. The check query status 408 is the monitoring level of the second request in accordance with an embodiment. When the status change 410 loop is triggered by the check query status 408, it checks for certain conditions. In an embodiment, the certain conditions could comprise no change, a response to the query 402, a termination of the query 402, or a timeout of the query 402 or any other condition described in accordance with an embodiment.

In the particular example for FIG. 4, the status change 410 shows as checking for no change, termination or timeout, or a response. In instances where no change to the status of the query 402 is detected, the check query status 408 is restarted. In other instances where a response to the query 402 is detected, the response results are ranked and provided for display on a display device in a manner described in the paragraphs above and below. In still other instances where a termination of the query 402 has been detected, the termination status is submitted to the digital infrastructure manager by the transmission 414 and the query 402 is terminated. The termination can originate from multiple places including the digital infrastructure manager, a network from the list of selected networks, the client, or any other location described in accordance with an embodiment. In some cases, a termination may be generated after submission of the query 402 to the networks, but before the check query status 408. In such instances, the query 402 is immediately terminated and the notice of termination is delivered to the digital infrastructure manager by the transmission 414. Similarly, when a timeout is detected, the timeout status is submitted to the digital infrastructure manager by the transmission 414, and the query 402 will terminate. The conditions for a timeout can originate from multiple places including the digital infrastructure manager, a network from the list of selected networks, the client, or any other location described in accordance with an embodiment.

A received response 416 could comprise an acceptance, offer, denial, suggestion, request for additional information, an action or termination of an action, data, a file, a digital communication, an application programming interface, or any other response described in accordance with an embodiment.

In accordance with an embodiment, the ranked responses 418 describes an organization of the received responses 416 according to certain conditions. In accordance with an embodiment, the certain conditions utilize one or more formula, equation, order, method, list, and/or process for ranking any received response 416 in a position. The certain conditions could originate from the digital infrastructure manager, the client, or any other location as described in accordance with an embodiment. In accordance with an embodiment, once the received responses 416 are ranked according to the certain conditions, the ranked responses are provided to the digital infrastructure manager such that they could be displayed in their ranked positions on a display device.

Figure 5:
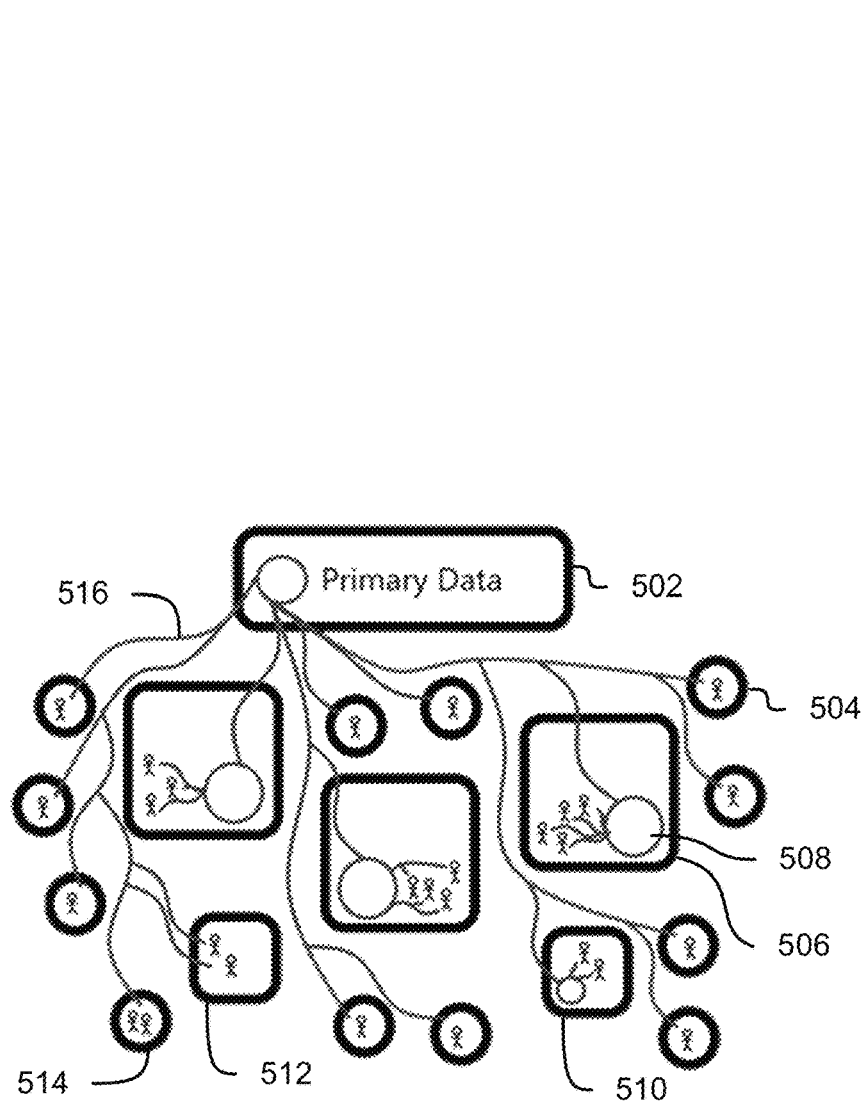
FIG. 5 illustrates a digital community of network services and network service providers in which various embodiments can be implemented.

FIG. 5 shows an illustrative example of how the network access controller connects clients to data over a digital infrastructure. The environment 500 includes primary data 502 which is also descried herein as the service request, being the target result of the request input or as otherwise described in the paragraphs above and below associated with a received request. The environment 500 also includes illustrative examples of clients 504-514, and the digital infrastructure manager 516.

The digital infrastructure manager 516 is the same digital infrastructure or network access controller mentioned in the paragraphs above and below. In an embodiment, the primary data 502 comprises various elements, actions, data, or executions as described in the paragraphs above and below, and specifically when described as a service request or the target of a request input.

In an embodiment, the client 506 comprises a different individual from client 504 that shares a locational, social, environmental, familial, or other relationship with client 504 where the interaction or relationship of data such as relevant but private past medical history data may be important for best future health management of both clients but where the privacy of each client must be maintained. In another environment, the client 506 comprises any other client type accessing data not previously mentioned.

In an embodiment, the client 508 comprises a group such as a family or other group with a social, activity, or employment relationship that stores relevant but private data such as but not limited to medical data for best future health management of the individuals and the entire group where this information can be securely accessed, shared or otherwise processed while maintaining the privacy of each of the individuals within the client. In another environment, the client 508 comprises any other client type accessing data not previously mentioned.

In an embodiment, the client 510 comprises an internal computer or data server that servers any group such as a family, business, or other organization by storing and processing relevant but private past medical history data and that internally processed data can then be stored, processed, or accessed for best future health management. In another environment, the client 510 comprises any other client type accessing data not previously mentioned.

In an embodiment, the client 512 comprises a group such as a family or other group with a social, activity, or employment relationship that is not officially documented or recognized in accordance with an embodiment, the solo client 504 comprises a single entity generating a first request input targeting the primary data 502 which is received and transmitted by the digital infrastructure manager 516 as described in the paragraphs above and below. For example, a solo client 504 could comprise an individual that requests access to or seeks to transfer or store medical history data on a service or network of services. In such an example, the medical data would represent the primary data 502. In another embodiment, the solo client 506 comprises a single service or network capable of generating a first request input which the digital infrastructure manager 516 could process as a request input. In yet another embodiment, the solo client 504 comprises a solo entity having a relationship or association with other solo clients on different networks or services, but who are also connected to the digital infrastructure manager 516. In such an embodiment, the privacy of each client must be maintained; however, both solo clients may generate first request inputs targeting the same primary data 502, and may be permitted to access the primary data with or without the knowledge of any other solo client sharing a relationship or association with another solo client 504. For example, where the primary data is relevant but private medical history data affecting both clients, the digital infrastructure manager 516 facilitates each solo client 504 to access the primary data 502, but secludes each solo clients 504 private information, identity, and characteristics from any other solo client 504 accessing the same primary data 502. In another environment, the client 504 comprises any other solo client type described in the paragraphs above and below, or targeting primary data 502 but not previously mentioned.

In the particular example environment illustrated by FIG. 5, the medium group client 506 comprises medium sized grouping of clients having a relationship or association to the other clients, to the primary data 502, and sharing a sub-group client 508 located within the larger service or network comprising the medium group client 506. In such embodiments, the digital infrastructure manager not only controls the client's access to the sub-group 508, the medium group client 506, and the primary data 502, but also manages the privacy and security of each individual client's identity and characteristics. For example, where a medium group 506 comprises a clinical trial group with each client having a device connected to a network on which the clinical trial is administered, the digital infrastructure manager 516 facilitates each client within the medium group client 506 to access the primary data 502 from the client device through a single data access tunnel to the primary data, while also secluding each client's data from any other client within the medium group client 506. In another environment, the medium group client 506 comprises only a medium sized grouping of clients who share a relationship or association to the other clients, to the primary data 502, and a medium-sized service or network capable of accessing primary data 502 and not previously mentioned.

In an embodiment, the sub-group client 508 comprises a computer or group of computers, a server or group of servers, a local area network or group of local area networks, or any grouping of services such a social, communication, business, or other organization, located within a larger service or network. In such environments, each client within the sub-group client 508 shares a relationship or association with other clients within the sub-group, as well as access to the larger service or network encompassing the sub-group 508. Each sub-group client 508 also shares a relationship or association with the primary data 502, and is managed by the digital infrastructure manager 516 though a shared access tunnel connected to the larger network encompassing the sub-group. In another environment, the client 508 comprises any sub-network as described in FIG. 1, FIG. 2, and the paragraphs above and below, or any other client type capable of accessing primary data 502 but not previously mentioned.

In accordance with an embodiment, the combo small group client 510 comprises a combination of the solo clients 504, the sub-group client 508, and the small group client 512. In accordance with an embodiment, the small group client 512 comprises a family of cellular devices, home network, a small business network, a small social network, a small server farm, or any other small grouping of client devices with an association or relationship to both the other client devices on that network and to the primary data 502, or any other small grouping of clients described in the paragraphs above and below.

In an embodiment, the partner client 514 comprises a grouping of two different solo clients 504 who share both a relationship or association to the primary data 502, but also share the same connection to the digital infrastructure manager 516. In such situations, the digital infrastructure manager receives first request inputs generated by either solo client 504 within the partner client 514 as a single request input delivered from a single client. Thus, the digital infrastructure manager effectively treats the partner client 514 as a single client entity, even when comprised of solo clients 504 and there is no segregation of the solo clients 504 data from any other solo client 504 within the partner client 514. In another embodiment, the client 514 comprises any other grouping of two client types capable of accessing primary data not previously mentioned. In another environment, the client 514 comprises any other client type accessing data not previously mentioned.

Figure 6:
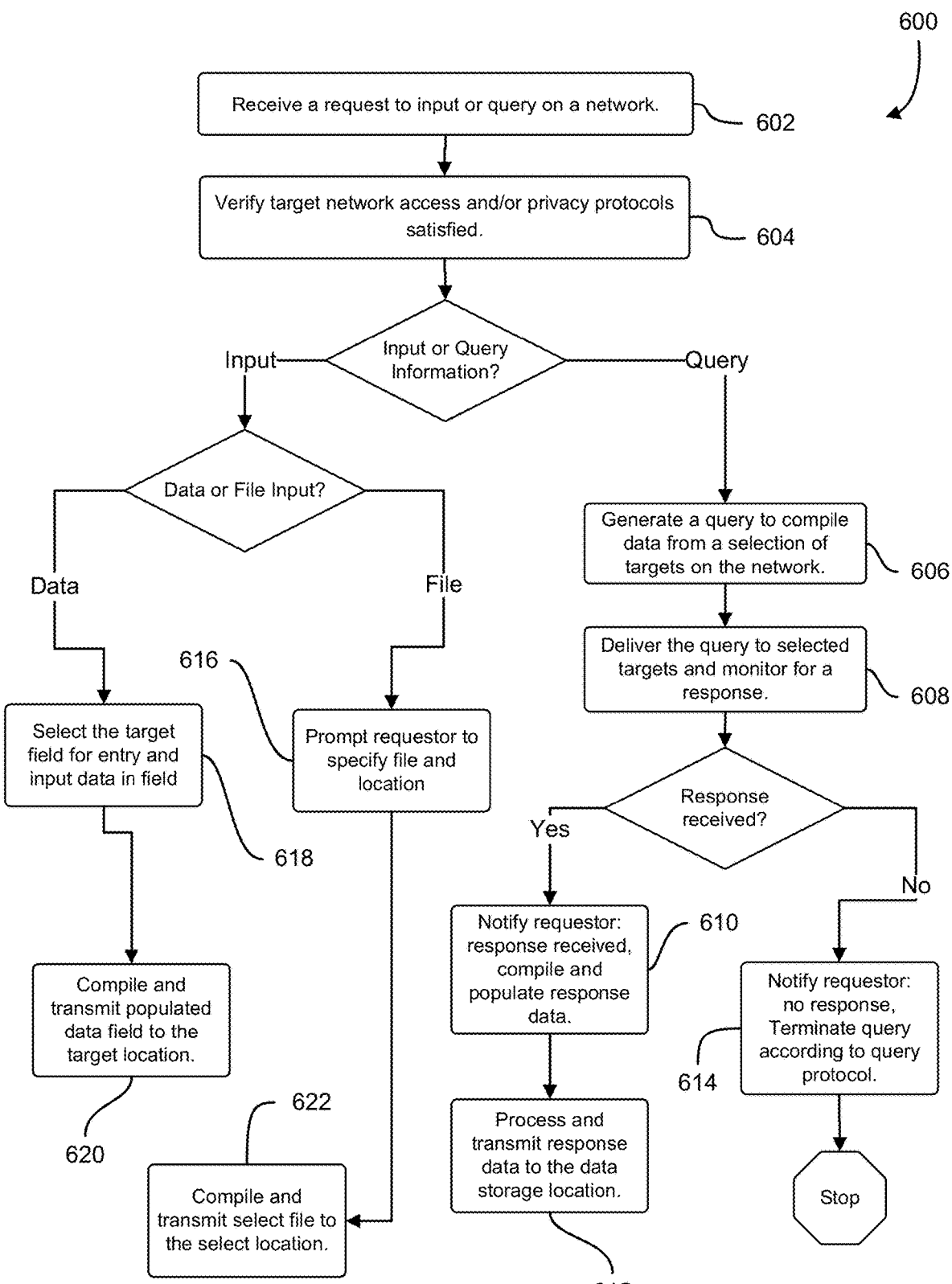
FIG. 6 is a flowchart illustrating how the digital infrastructure manager could process and handle a requested input or query to a network with special access protocols in accordance with an embodiment.

FIG. 6 shows an illustrative example of a data architecture for processing a first request input relating to a record, document, or data field input on a service connected to a digital network in accordance with an embodiment. The environment 600 can be the same process as the request input 210 described in FIG. 2. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of the process 600 may be performed by any suitable system, such as the digital infrastructure manager 104 of FIG. 1. The process 600 includes a series of operations wherein the digital infrastructure manager receives an input or a query request 602. Note that one or more of the operations performed in 602-20 may be performed in various orders and combinations, including in parallel.

In accordance with an embodiment, the input or query 602 comprises a request to input data or text into an application field, program, or other similar location. In another embodiment, the input or query 602 comprises a query to find a file on a target network, or to input, store or transfer a file to or from a target network. In yet another embodiment, the input or query 602 comprises generating a request for data, survey, poll, or questionnaire seeking data from any or all clients or users who are associated with the target data or network.

In accordance with an embodiment, the verification 604 comprises requiring the digital infrastructure manager to verify and certify that the target service and/or network access protocols are satisfied. Target networks often maintain limited or restrictive access protocols or specifically relating to medical data and networks, privacy protocols intended to ensure the protection to information associated with a user, client, program, or establishment. In an embodiment where a limited access protocol is employed, the verification 604 verifies, certifies, and authenticates with the target network that the requestor satisfies the limited access protocols required by the target network. In accordance with an embodiment, the requestor includes a client or group of clients, a user or group of users, a service or group of services, a server, computer or a network of servers and computers, or any other requestor described herein. For example, where the input or query 602 relates to a clinical trial, the limited access policy may restrict access to individuals who meet specific regulatory requirements. In such situations, the verification 604 would verify that the user, client, program, or establishment meets those specific regulatory requirements, with or without disclosing any information, identity, or characteristics about the user/client during the verification process. In another example, the limited access policy of the target network or service could require a client certification of identity, but the nature of the clinical trial could require client anonymity. In such situations, the client could obtain certification through an independent service, the certification being transmitted to the client as a token, digital signature, or other digital approval that the client could then store and the digital infrastructure manager could read and process. The verification 604 would then seek the client's digital certification in the stored location, verify it, then transmit the certification's validity to the target network without disclosing any information associated with the client to the target network.

As described in the paragraphs above and below, the verification, certification, and authentication can be based on the identity and characteristics of the digital infrastructure manager itself, or can include information associated with the identity and characteristics of the requestor. In another embodiment where a privacy protocol is employed or required for data compliance or regulation, the verification 604 verifies, certifies, and authenticates that the identity and characteristics of the requestor meet the privacy or data compliance requirements of the target network or data. In the particular example where an input or query 602 is targeting data or a network where the client or user's identity must be validated, but where the nature of the input or query require the client or user to remain anonymous, the verification 604 will conduct the validation of the client or user's identity and present either a positive validation response or a negative validation response to the target network or data for the purpose of securing access, but will screen or otherwise mask the client or user's identity and characteristics.

In an embodiment, the second query 606 processes the instructions contained in the input or query 602 to be transmitted to a selection of networks. For example, where the input or query 602 contains instructions relating to a clinical trial, target data submission relating to compliance with clinical trial requirements, individual experience of the target, or any other relevant data can be performed while maintaining complete privacy of information associated with each target. In another example also associated with a clinical trial, the second query 606 could comprise clinician or patient-initiated removal from the clinical trial process with or without deletion of all data previously submitted. In an embodiment not associated with a clinical trial, the second query 606 comprises mining submitted data, seeking input or a response from a target, or any other activity described in the paragraphs above and below relating to target or client input or query.

In an embodiment, the query loop 608 delivers the second query to the targets identified in the input or query 602. The targets can be clients, users, servers, networks, groups of servers or networks, or servers or networks where interconnections are intermittently limited. The query loop 608 monitors all targets to which the second query 606 is submitted for a response unless instructed to be terminated, timed-out, or completed by either the positive response process 610 or the negative response process 614 in accordance with an embodiment.

In an embodiment, positive response process 610 is a data monitoring and instruction loop which directs the processing or satisfaction of a query in the event of positive response data. When the query loop 608 detects a response to the submitted second query 606, the positive response process 610 compiles the response data according to instructions contained in the second query 606 in accordance with an embodiment. Compiling the response could comprise storing or processing of de-identified data such that the information generated from the data is beneficial but where no information identifying the data source is retained after processing. Compiled response data is then populated in the query format in accordance with an embodiment. This query response data could comprise printing, displaying, storing, transferring, screening, de-identifying, formatting, translating, sorting, associating, or any other data manipulation required to populate the related query.

In an embodiment, the data processing 612 receives the compiled and populated response data and processed the response data according to instructions contained in the second query 606. Processing the query data could comprise de-identifying data as described in the paragraphs above, as well as additional formatting, translating, mining, correlating, or any other data processing required. Processed response data is then transmitted using a transmission channel by the data processing 612 to the storage location or locations according to instructions contained in the second query 606 in accordance with an embodiment. Transmitting the response data could comprise encrypted, unencrypted, digital-to-digital, digital-to-analog, analog-to-analog, line coding, uni-polar encoding, polar encoding, bipolar encoding, sampling, parallel transmission, serial transmission, asynchronous serial transmission, synchronous serial transmission or any other transmission described herein. The data storage location could be connected to a network, the internet, both or neither, and could comprise a local server or group of servers, a cloud-based server, hard disk drives, floppy discs, tapes, compact discs, DVD or Blue-ray discs, USB flash drives, secure digital bards, solid-state drives, punch cards, motherboards, primary storage, secondary storage, tertiary storage, off-line storage, redundant storage devices, or any other digital data storage device described herein. As an illustrative example, in an implementation where the selected storage location is a USB flash drive that is not connected to the internet or a network, the USB flash drive would need to be connected to the digital infrastructure manager client divide directly, and transmission would involve writing the processed data to the USB device during transmission. As another illustrative example, in an implementation where the selected storage location is identified as a fax machine storage medium, processed response data would be transmitted using a transmission method as described above and stored in the storage medium on the fax machine. Implementations other than the two illustrative examples presented in this paragraph are possible in accordance with an embodiment.

In an embodiment, the negative response process 614 is a data monitoring and instruction loop which directs the processing or termination of a query in the event of negative response data. Negative response data can include no response, an incomplete response, an incorrect response, or any other response related to a query as described herein. In an implementation where no response is received, the negative response process 614 would notify the requestor who generated the input or query 602 indicating no response data received and would terminate the query process according to instructions associated with the input or query 602. In the particular example illustrated in FIG. 6, the input or query 602 includes instruction protocol directing the negative response process 614 to terminate the entire query if no response data is received. In another implementation, the input or query 602 includes instructions to terminate the query only with respect to the target or targets that did not respond to the query. In yet another implementation, the input or query 602 includes instructions to send a notification to resubmit the query, or to request additional information, or to send a reminder to the target or targets. The response process 614 can monitor for response data unless terminated, and can include qualifiers such as a time period for receiving response data, the type of response data required, or any other qualifier related to query response data descried herein.

In another embodiment, the requestor prompt 616 prompts the requestor to specify the target file, initial location of the target file, and the next location of the target file. The requestor can be any actor as described above and below who submits the input or query 602 received by the digital infrastructure manager.

In another embodiment, the data target 618 selects the target fields in which the requestor seeks to enter data. The target fields could comprise a network identifier, an internet search or address bar, a local server or group of server address, a cloud-based server address, a form field, hard disk drive location, floppy disc location, tape root, compact disc location, DVD or Blue-ray disc location, USB flash drive location, secure digital bard location, solid-state drive location, punch card root, motherboard storage, primary storage, secondary storage, tertiary storage, off-line storage, redundant storage device location, or any other data entry location.

In an embodiment, the data transmission 620 transmits the entered data according to the transmission discussed in the paragraphs above and below to the target location. Target data locations could comprise a network or group of networks, the internet, a server or group of servers, a cloud-based server, hard disk drives, floppy discs, tapes, compact discs, DVD or Blue-ray discs, USB flash drives, secure digital bards, solid-state drives, punch cards, motherboards, primary storage, secondary storage, tertiary storage, off-line storage, redundant storage devices, or any other digital data storage device described herein.

In an embodiment, the file transmission 6220 transmits the data according to the transmission discussed in the paragraphs above and below to the target location. Target data locations could comprise a network or group of networks, the internet, a server or group of servers, a cloud-based server, hard disk drives, floppy discs, tapes, compact discs, DVD or Blue-ray discs, USB flash drives, secure digital bards, solid-state drives, punch cards, motherboards, primary storage, secondary storage, tertiary storage, off-line storage, redundant storage devices, or any other digital data storage device described herein.

Figure 7:
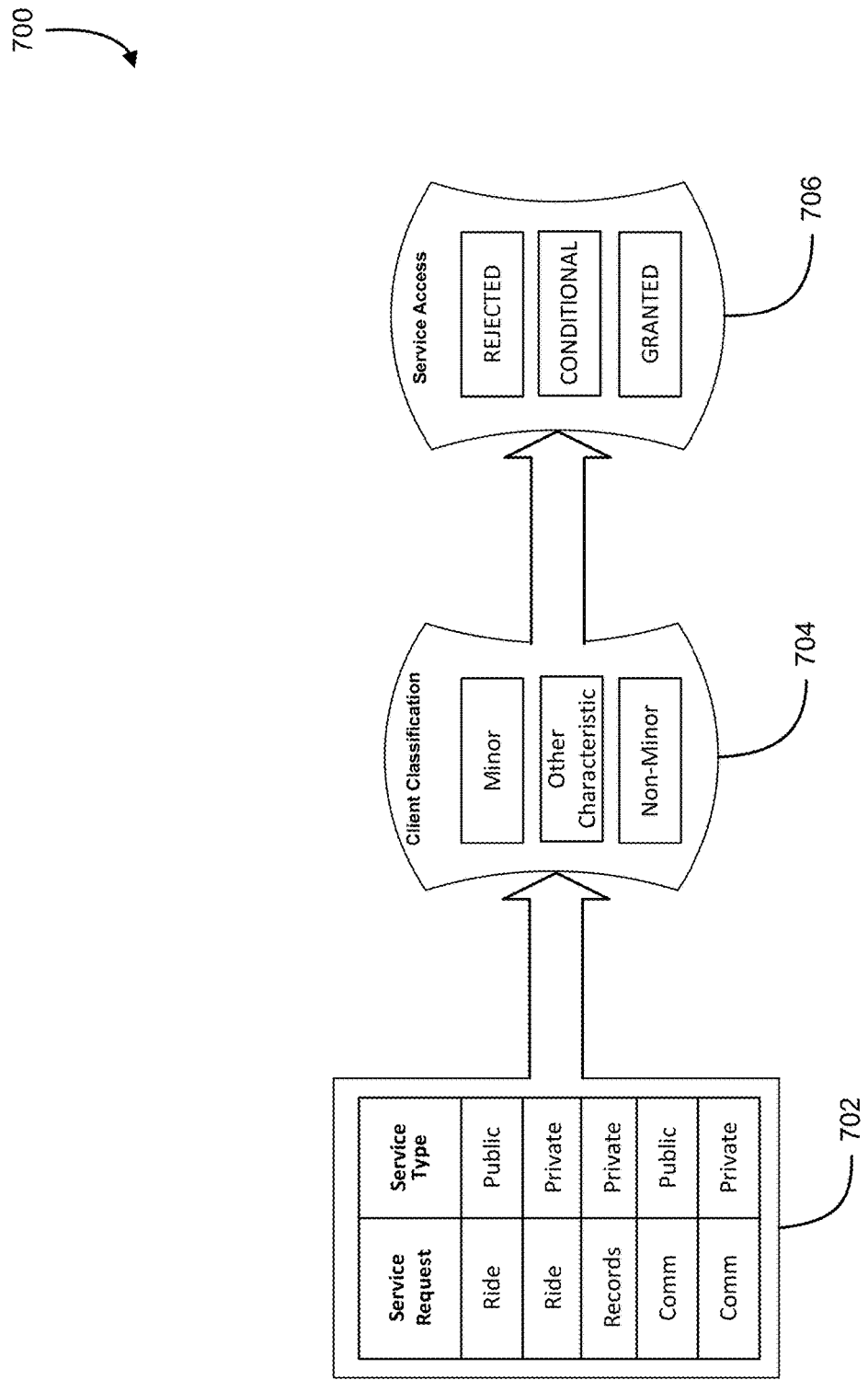
FIG. 7 is a flowchart that illustrates an example of how the digital infrastructure managers could classify a request for network access based on parameters related to the end-user device, the network, and the request in accordance with an embodiment.

FIG. 7 is a data flow diagram illustrating the process of a network access qualification in accordance with an embodiment. The environment 700 illustrates the process of the same network access 106 referred to in FIG. 1, and a portion of the same processes described in network access tunnel 204 of FIG. 2, client classification 306 of FIG. 3, additional networks 406 of FIG. 4, service access tunnel 516 of FIG. 5, and verification 604 in FIG. 6, and other processes described in the paragraphs above and below. When a client seeks to execute some action on a service, the digital infrastructure manager must determine the nature of the action and what services can satisfy the action, as well as whether the client even has access to the service. The environment 700 includes various service requests posed to various service types which can be evaluated individually or in conjunction to comprise a request input 702 in accordance with an embodiment. The request input 702 is then passed to a client classification 704 and to an access determination 706. In various embodiments, some or all of the process described in environment 700 can be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 700 may be performed by any suitable system, such as the digital infrastructure manager 104 of FIG. 1.

In an embodiment, the request input 702 is the same request input 210 as described in FIG. 2 and other paragraphs above and below. The request input 702 comprises the same processes and steps as described in received query 304 of FIG. 3 and this and other paragraphs above and below. When a client selects from a plurality of client-selectable options display in a client interface device, those options evaluated individually or in conjunction indicate a target outcome in accordance with an embodiment. The request input 702 processes the client-selectable options to determine the service type necessary to satisfy the configuration of options in accordance with an embodiment. A single service type can be utilized in multiple implementations. In some embodiments, the service type could be comprised of other service type(s). In such cases, the digital infrastructure manager includes any relevant other service types in its process of determining which protocol will satisfy the service request.

In the particular implementation described in the environment 700, the plurality of client-selectable settings indicated by the target outcomes of the input request 702 can include a ride request on a public service, a ride request on a private service, a records request on a private service, or a communication on a private or public service. In accordance with embodiments, however, other combinations of service requests and service types are possible as described in other paragraphs above and below.

For example, in an implementation where the digital infrastructure manager receives a plurality of client-selectable settings which include a GPS location or locations, start or end time for the request service, and a number of cargo(s) to be carried, the request input 702 would process these settings to determine the request type indicates a ride request. Where the request input 702 indicates a ride on a public service type, the digital infrastructure manager compiles all the public service types available to satisfy the request and may use information associated with the requesting client or client classification 704 to determine if access to the service type(s) is permissible. The digital infrastructure manager may pass or include information associated with the requesting client to an authentication module during the login process to a service type; however, authentication by an authentication module is based on the digital infrastructure manager's identity and credentials. In implementations where the target outcome indicates a ride on a private service type, the digital infrastructure manager must use information associated with the requesting client or client classification 704 to determine both whether access to the service type is permissible and whether the service type can satisfy the service request.

In other implementations where the digital infrastructure manager receives a plurality of client-selectable settings, the request input 702 would process the settings to determine a records request to a service type. The client-selectable settings could include a specific service type target, an input, output, transfer, action, request, instruction, digital communication, or any other setting described in the paragraphs above and below. The service types could comprise public, private, both public and private in combination, or any other service type described in the paragraphs above and below.

The client classification 704 determines whether the client possesses characteristics that are important for determining service access or whether a particular service type can satisfy the service request. Client classification status is included in the access token assigned to the client during authentication to the digital infrastructure manager. The client classification 704 collects data associated with the client which could comprise the client's identity and characteristics, a list of services to which they have prior access permissions, or any other information described in the paragraphs above and below.

The service access 706 permits the client to access services according to an access control policy. The access policy is intended at least in part to control access to service types based at least in part on information associated with a client, the service request, the service type, all three in combination, or any other requirements as described in the paragraphs above and below or commonly known in the relevant field.

In some implementations, the access policy assigns a granted service access 706 status to a client based on their service request and service type, but without any information from the client classification 704. For example, where a client submits a service request to a service type that does not have access restrictions, or where a client submits a service request of a certain nature to a service type that does have limited access controls but which is known to satisfy only service requests of that certain nature, service access would be granted without any client classification information.

In other implementations, access to service types is granted or rejected based on information contained in the service request combined with the client classification 704. For example, where a client classified as a minor has submitted an input request 702 indicating a ride service request, the service access 706 would only grant the client access to a private service type due to the minor status classification. This access restriction is intended as a protective measure to restrict clients classified as minors from accessing public service types unregulated. Thus, a client classified as a minor in the example above would be assigned a rejected service access 706 status for a request input 702 to a public service type, but would be assigned a granted service access 706 status for a request input to a private service type.

In yet another implementation, access to service types could be conditional. In such implementations, conditional access could comprise requiring the digital infrastructure managers to verify or certify that the requesting client has certain characteristics required by the service type's access policy. Should the digital infrastructure manager provide the verification or certification, a conditional service access 706 status could be granted. In accordance with an embodiment, the conditional access could comprise restricting access to a period of time or granting a client access to only certain services on the service type.

In embodiments where the digital infrastructure manager is asked to verify or certify that the client has certain characteristics, or embodiments where information contained in the client classification 704 is used to evaluate service access, the digital infrastructure manager can restrict or allow the service type or service type access policy to access the certain characteristics or client classification data.

Figure 8:
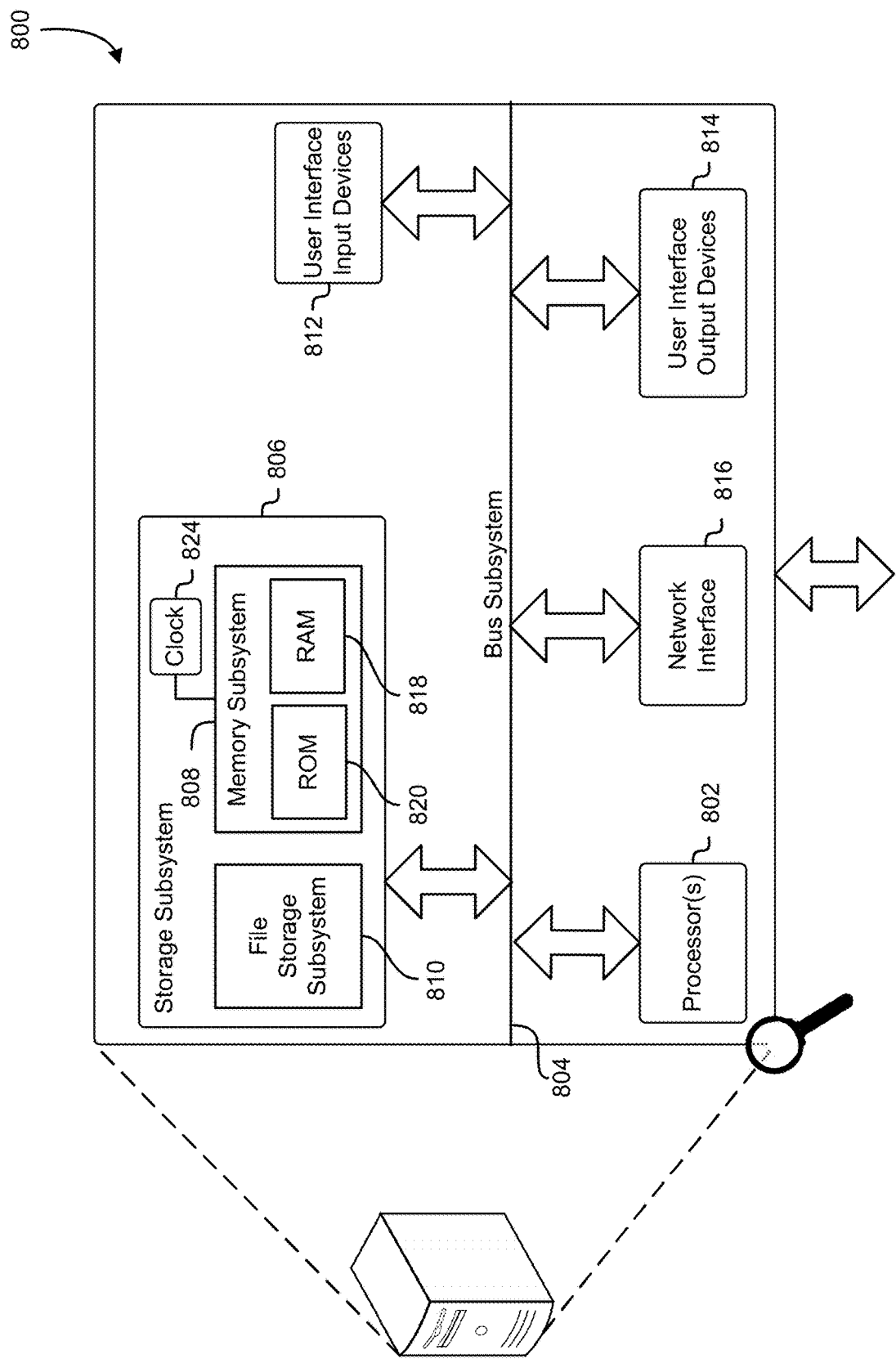
FIG. 8 illustrates an example of a computing environment in which various embodiments can be practiced.

FIG. 8 is an illustrative, simplified block diagram of a computing device 800 that can be used to practice at least one embodiment of the present disclosure. In various embodiments, the computing device 800 includes any appropriate device operable to send and/or receive requests, messages, or information over an appropriate network and convey information back to a user of the device. The computing device 800 may be used to implement any of the systems illustrated and described above. For example, the computing device 800 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 800 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 8, the computing device 800 may include one or more processors 802 that, in embodiments, communicate with and are operatively coupled to a number of peripheral subsystems via a bus subsystem. In some embodiments, these peripheral subsystems include a storage subsystem 806, comprising a memory subsystem 808 and a file/disk storage subsystem 810, one or more user interface input devices 812, one or more user interface output devices 814, and a network interface subsystem 816. Such storage subsystem 806 may be used for temporary or long-term storage of information.

In some embodiments, the bus subsystem 804 may provide a mechanism for enabling the various components and subsystems of computing device 800 to communicate with each other as intended. Although the bus subsystem 804 is shown schematically as a single bus, alternative embodiments of the bus subsystem utilize multiple buses. The network interface subsystem 816 may provide an interface to other computing devices and networks. The network interface subsystem 816 may serve as an interface for receiving data from and transmitting data to other systems from the computing device 800. In some embodiments, the bus subsystem 804 is utilized for communicating data such as details, search terms, and so on. In an embodiment, the network interface subsystem 816 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 816 is enabled by wired and/or wireless connections and combinations thereof.

In some embodiments, the user interface input devices 812 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 800. In some embodiments, the one or more user interface output devices 814 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device.

In general, use of the term "output device" is intended to include all possible types of devices and mechanisms for outputting information from the computing device 800. The one or more user interface output devices 814 can be used, for example, to present user interfaces to facilitate user interaction with applications performing processes described and variations therein, when such interaction may be appropriate.

In some embodiments, the storage subsystem 806 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 806. These application modules or instructions can be executed by the one or more processors 802. In various embodiments, the storage subsystem 806 additionally provides a repository for storing data used in accordance with the present disclosure. In some embodiments, the storage subsystem 806 comprises a memory subsystem 808 and a file/disk storage subsystem 810.

In embodiments, the memory subsystem 808 includes a number of memories, such as a main random access memory (RAM) 818 for storage of instructions and data during program execution and/or a read only memory (ROM) 820, in which fixed instructions can be stored. In some embodiments, the file/disk storage subsystem 810 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 800 includes at least one local clock 824. The at least one local clock 824, in some embodiments, is a counter that represents the number of ticks that have transpired from a particular starting date and, in some embodiments, is located integrally within the computing device 800. In various embodiments, the at least one local clock 824 is used to synchronize data transfers in the processors for the computing device 800 and the subsystems included therein at specific clock pulses and can be used to coordinate synchronous operations between the computing device 800 and other systems in a data center. In another embodiment, the local clock is a programmable interval timer.

The computing device 800 could be of any of a variety of types, including a portable computer device, tablet computer, a workstation, or any other device described below. Additionally, the computing device 800 can include another device that, in some embodiments, can be connected to the computing device 800 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 800 for processing. Due to the ever-changing nature of computers and networks, the description of the computing device 800 depicted in FIG. 8 is intended only as a specific example for purposes of illustrating the preferred embodiment of the device. Many other configurations having more or fewer components than the system depicted in FIG. 8 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 800 may include any appropriate hardware, software and firmware for integrating with a data store as needed to execute aspects of one or more applications for the computing device 800 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 800 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 800 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 800 may provide the content in one or more forms including, but not limited to, forms that are perceptible to the user audibly, visually, and/or through other senses. The handling of requests and responses, as well as the delivery of content, in an embodiment, is handled by the computing device 800 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 800 typically will include an operating system that provides executable program instructions for the general administration and operation of the computing device 800 and includes a computer-readable storage medium (e.g., a hard disk, random access memory (RAM), read only memory (ROM), etc.) storing instructions that if executed (e.g., as a result of being executed) by a processor of the computing device 800 cause or otherwise allow the computing device 800 to perform its intended functions (e.g., the functions are performed as a result of one or more processors of the computing device 800 executing instructions stored on a computer-readable storage medium).

In an embodiment, the computing device 800 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 800 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 800 is capable of storing, retrieving, and accessing structured or unstructured data. In an embodiment, computing device 800 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C"

refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   causing a network access controller to authenticate access to one or more services over one or more networks, for one or more requests to perform one or more operations from one or more client access devices by:
   receiving a first electronic request to perform an operation on the one or more networks, the first electronic request comprising a plurality of selectable settings and one or more embedded data;
   generating an authentication classification based, at least in part, on information included in the first electronic request, comprising an identity validation of one or more requesting clients which does not disclose identifying information about the one or more requesting clients;
   identifying one or more services from a plurality of services capable of satisfying one or more parts of the first electronic request, the one or more identified services comprising at least one computing component accessible through two or more different networks;
   determining if service access is permissible on each of the one or more networks based, at least in part, on the authentication classification;
   generating a first query based, at least in part, on information contained in the first electronic request;
   generating a second electronic request to perform at least a part of the operation, comprising at least one or more results of the first query and information included in the first electronic request and the authentication classification for each of the one or more networks;
   submitting the second electronic request to the one or more access permissible services over the one or more networks;
   receiving a response to the second electronic request from the one or more access permissible services, the response comprising one or more results which satisfy, at least in part, the operation;
   obtaining ranked results by ordering the one or more results based, at least in part, on which results satisfy one or more of the plurality of selectable settings in the first electronic request; and
   providing the ranked results for display on a display device accessible by the one or more client devices.

2. The computer-implemented method of claim 1, wherein the second electronic request enables the one or more requesting clients to simultaneously access the plurality of services over two or more different networks.

3. The computer-implemented method of claim 1, wherein the operation to be performed comprises at least one of:
   a purchase or sale of an item;
   seeking or offering transportation;
   facilitating delivery of one or more products;
   obtaining or delivering at least one of one or more records or one or more documents;
   transmitting and/or receiving one or more digital communications;
   electronic data transfer from one or more computing devices to one or more other computing devices;
   transferring at least one of currency or value electronically; or
   sharing access permission electronically.

4. The computer-implemented method of claim 1, wherein the authentication classification comprises one or more of:
   an identifying dataset received from a client;
   access tokens validating access is permissible to one or more access controlled services;
   validations of the identifying dataset as associated with the client;
   one or more tokens based at least in part on the validated identifying dataset;
   one or more token transmission confirmations; or
   one or more token verifications to gain or grant access to the one or more access controlled services.

5. The computer-implemented method of claim 4, wherein the dataset comprises one or more of:
   an internet protocol address;
   a computing device identifier;
   a name;
   a phone number;
   an email address or other digital mail address;
   an alias associated with the client device; or
   an alpha-numeric string comprising numbers, letters, symbols or a combination thereof.

6. A system, comprising:
one or more processors, and
memory including computer-executable instructions that, when executed by the one or more processors, cause the system to authenticate access to one or more services over one or more networks, for one or more requests to perform one or more operations from one or more client access devices by:
- receiving a first electronic request to perform an operation;
- generating an authentication classification comprising an identity validation of one or more requesting clients which does not disclose information about the one or more requesting clients;
- identifying a plurality of services capable of satisfying one or more parts of the operation, the plurality of services comprising one or more computing components accessible over one or more networks;
- authenticating access to the one or more services of the plurality of services based, at least in part, on the authentication classification, wherein the authentication is determined for each of the one or more networks;
- generating a first query based, at least in part, on information included in the first electronic request and the authentication classification;
- generating a second electronic request to perform at least a part of the operation, comprising one or more results from the one first query and information included in the first electronic request and the authentication classification for each of the one or more networks;
- submit the second electronic request to the one or more access permissible services over one or more networks;
- receive a response to the second electronic
- obtain ranked results by ordering the one or more results; and
- provide the ranked results for display on a display device accessible by the one or more client access devices.

7. The system of claim 6, wherein the computer-executable instructions further include instructions that cause the system to perform one or more computing actions or occurrences based, at least in part, on executable instructions included in the second electronic request, to enable one or more requesting clients to authenticate access to one or more of a plurality of services over two or more different networks.

8. The system of claim 6, wherein the computer-executable instructions further cause the system to relate-perform computing steps relating to:
- a purchase or sale;
- seeking or offering transportation;
- coordinating delivery of one or more products;
- executing, transmitting, or otherwise enabling electronic communication;
- electronic document or records management;
- electronic data transfer;
- one or more parts of one or more financial transactions; and
- sharing access permission electronically.

9. The system of claim 6, wherein the computer-executable instructions that cause the system to;
- authenticate access with the plurality of services with an authentication classification comprising instructions that cause the system to:
  - receive a dataset from the client;
  - request access to an access controlled service;
  - validate the dataset as associated with the client;
  - generate a token;
  - transmit the token to the client and to one or more services; and
  - verify the token with one or more services to facilitate access to the one or more services without disclosing identifying information about the client.

10. The system of claim 9, wherein the dataset from the client comprises at least one of:
- an internet protocol address;
- a computing device identifier;
- a digital identity associated with the client; and
- an alpha-numeric string comprising numbers, letters, symbols or a combination of numbers, letters, or symbols, identifying the client.

11. A set of one or more non-transitory computer-readable storage media having stored thereon executable instructions that, as a result of being executed by one or more processors of a computer system, cause the computer system to authenticate access to one or more services over one or more networks for one or more requests to perform one or more operations from one or more client access devices by:
- generating a first action or occurrence over the one or more networks, the action or occurrence comprising a plurality of selectable settings and embedded data;
- generating an authentication classification based, at least in part, on information included in the first action or occurrence;
- identifying one or more services from a plurality of services capable of satisfying one or more parts of the first action or occurrence, the one or more identified services comprising at least one computing component accessible through two or more different networks;
- authenticate access to the one or more services by one or more computing devices based, at least in part, on the authentication classification for each of the one or more networks;
- generate one or more queries based on information associated with the action or occurrence;
- generate a second action or occurrence comprising at least one result from the one or more queries, and information included in the first action or occurrence, and the authentication classification for each of the one or more networks;
- submit the second action or occurrence to the one or more authenticated services;
- receive a response comprising data relating to one or both of the first or second action or occurrence;
- rank the response data by relevance to the one or both of the first or second action or occurrence; and
- provide the response for display on a display device accessible by the one or more client access devices.

12. The non-transitory computer-readable storage medium of claim 11, wherein the executable instructions further include instructions that cause the computer system to simultaneously authenticate to one or more of a plurality of services connected to two or more different digital networks.

13. The non-transitory computer-readable storage medium of claim 11, wherein the executable instructions further include instructions that cause the computer system to:
- perform on one or more of the plurality of services connected to a digital network at least one of:
  - a digital retail transaction;

a digital offer or acceptance of services;
transmission of document or data;
digital communications;
electronic data transfer from one or more computing devices to one or more other computing devices;
digital financial transaction; and
digital access sharing.

14. The non-transitory computer-readable storage medium of claim 11, wherein the executable instructions that cause the computer system to authenticate to the one or more services include executable instructions that cause the computer system to:
receive a dataset;
request access to a service over one or more digital networks;
validate the dataset;
generate a token based at least in part on the dataset;
transmit the token; and
verify the token before accessing the service.

15. The non-transitory computer-readable storage medium of claim 14, wherein the executable instructions that cause the computer system to validate the dataset by digitally validating the client but does not disclose identifying information about the client to the services or the networks.

* * * * *